(12) United States Patent
Babadi et al.

(10) Patent No.: US 12,131,498 B2
(45) Date of Patent: Oct. 29, 2024

(54) CODING FOR MULTIPLEXED FLUORESCENCE MICROSCOPY

(71) Applicants: The Broad Institute, Inc., Cambridge, MA (US); Massachusetts Institute of Technology, Cambridge, MA (US); Yeda Research and Development Co. LTD. of Weizmann Institute of Science, Rehovot (IL); National University of Ireland Maynooth, Kildare (IE)

(72) Inventors: Mehrtash Babadi, Cambridge, MA (US); Luca D'Alessio, Cambridge, MA (US); Muriel Medard, Cambridge, MA (US); Ken Duffy, Maynooth (IE); Yonina Eldar, Rehovot (IL); Litian Liu, Cambridge, MA (US)

(73) Assignees: The Broad Institute, Inc., Cambridge, MA (US); Massachusetts Institute of Technology, Cambridge, MA (US); Yeda Research and Development Co. LTD. of Weizmann Institute of Science, Rehovot (IL); National University of Ireland Maynooth, Kildare (IE)

( * ) Notice: Subject to any disclaimer, the term of this patent is extended or adjusted under 35 U.S.C. 154(b) by 378 days.

(21) Appl. No.: 17/730,377

(22) Filed: Apr. 27, 2022

(65) Prior Publication Data

US 2022/0358672 A1 Nov. 10, 2022

Related U.S. Application Data

(60) Provisional application No. 63/182,364, filed on Apr. 30, 2021.

(51) Int. Cl.
*G06T 7/73* (2017.01)
*G01N 21/64* (2006.01)
(Continued)

(52) U.S. Cl.
CPC ........... *G06T 7/73* (2017.01); *G01N 21/6458* (2013.01); *G06V 10/98* (2022.01); *G06V 20/698* (2022.01);
(Continued)

(58) Field of Classification Search
USPC ....................................................... 382/103
See application file for complete search history.

(56) References Cited

U.S. PATENT DOCUMENTS

| | | | |
|---|---|---|---|
| 8,791,429 B2 * | 7/2014 | Kim .................. | G01N 21/6458 250/459.1 |
| 9,771,612 B2 * | 9/2017 | Hori .................... | C12Q 1/6816 |
| 2007/0243523 A1 * | 10/2007 | Ionescu-Zanetti ......................... | G01N 15/1459 977/924 |

OTHER PUBLICATIONS

Chen, Kok Hao, Alistair N. Boettiger, Jeffrey R. Moffitt, Siyuan Wang, and Xiaowei Zhuang. "Spatially resolved, highly multiplexed RNA profiling in single cells." Science 348, No. 6233 (2015): aaa6090.

(Continued)

*Primary Examiner* — Darryl V Dottin
(74) *Attorney, Agent, or Firm* — Occhiuti & Rohlicek LLP

(57) ABSTRACT

A way to design a codebook for estimating the type of a molecule at a particular location in a fluorescence microscopy image makes use of one or both of (1) knowledge of the non-uniform prior distribution of molecule types (i.e., some types are known a priori to occur more frequently than others) and/or knowledge of co-occurrence of molecule types at close locations (e.g., in a same cell); and (2)

(Continued)

knowledge of a model of the (e.g., random) process that yields the intensities that are expected at a location when a molecule with a particular subset of markers (i.e., a molecule of a type that has been assigned a codeword that defines that subset) is present at that location. The codebook design may provide experimental efficiency by reducing the number of images that need to be acquired and/or improve classification or detection accuracy by making the codewords for different molecule types more distinctive.

17 Claims, 4 Drawing Sheets

(51) Int. Cl.
    *G06V 10/98*     (2022.01)
    *G06V 20/00*     (2022.01)
    *G06V 20/69*     (2022.01)

(52) U.S. Cl.
    CPC ..... *G06V 20/95* (2022.01); *G01N 2021/6441* (2013.01); *G06T 2207/10056* (2013.01); *G06T 2207/10064* (2013.01); *G06T 2207/30242* (2013.01)

(56) References Cited

OTHER PUBLICATIONS

D'Alessio, Luca, Litian Liu, Ken Duffy, Yonina C. Eldar, Muriel Médard, and Mehrtash Babadi. "A coding theory perspective on multiplexed molecular profiling of biological tissues." In 2020 International Symposium on Information Theory and its Applications (ISITA), pp. 309-313. IEEE, 2020.

Eng, Chee-Huat Linus, Michael Lawson, Qian Zhu, Ruben Dries, Noushin Koulena, Yodai Takei, Jina Yun et al. "Transcriptome-scale super-resolved imaging in tissues by RNA seqFISH+." Nature 568, No. 7751 (2019): 235-239.

Huang, Lingchen, Huazi Zhang, Rong Li, Yiqun Ge, and Jun Wang. "AI coding: Learning to construct error correction codes." IEEE Transactions on Communications 68, No. 1 (2019): 26-39.

Marina, Ninoslav. "LDPC codes for binary asymmetric channels." In 2008 International Conference on Telecommunications, pp. 1-7. IEEE, 2008.

Mazyavkina, Nina, Sergey Sviridov, Sergei Ivanov, and Evgeny Burnaev. "Reinforcement learning for combinatorial optimization: A survey." Computers & Operations Research 134 (2021): 105400.

Moffitt, Jeffrey R., Junjie Hao, Dhananjay Bambah-Mukku, Tian Lu, Catherine Dulac, and Xiaowei Zhuang. "High-performance multiplexed fluorescence in situ hybridization in culture and tissue with matrix imprinting and clearing." Proceedings of the National Academy of Sciences 113, No. 50 (2016): 14456-14461.

Moffitt, Jeffrey R., Junjie Hao, Guiping Wang, Kok Hao Chen, Hazen P. Babcock, and Xiaowei Zhuang. "High-throughput single-cell gene-expression profiling with multiplexed error-robust fluorescence in situ hybridization." Proceedings of the National Academy of Sciences 113, No. 39 (2016): 11046-11051.

Shah, Sheel, Eric Lubeck, Wen Zhou, and Long Cai. "In situ transcription profiling of single cells reveals spatial organization of cells in the mouse hippocampus." Neuron 92, No. 2 (2016): 342-357. Harvard.

Shah, Sheel, Eric Lubeck, Wen Zhou, and Long Cai. "seqFISH accurately detects transcripts in single cells and reveals robust spatial organization in the hippocampus." Neuron 94, No. 4 (2017): 752-758.

Wu, Chai Wah. "Designing communication systems via iterative improvement: error correction coding with Bayes decoder and codebook optimized for source symbol error." arXiv preprint arXiv:1805.07429 (2018).

Xia, Chenglong, Hazen P. Babcock, Jeffrey R. Moffitt, and Xiaowei Zhuang. "Multiplexed detection of RNA using MERFISH and branched DNA amplification." Scientific reports 9, No. 1 (2019): 1-13.

\* cited by examiner

CODING FOR MULTIPLEXED FLUORESCENCE MICROSCOPY

CROSS-REFERENCE TO RELATED APPLICATIONS

This application claims the benefit of U.S. Provisional Application No. 63/182,364, filed Apr. 30, 2021, which is incorporated herein by reference.

BACKGROUND

This invention relates to Multiplexed Fluorescence Microscopy, and more particular to the designing of a coding or marking of molecule types for use in such microscopy and related techniques.

Multiplexed fluorescence in situ (in-place) hybridization (mFISH) microscopy involves sensing the presence of fluorescent markers that have been attached to different types of molecules in a biological sample. Markers are generally excitable by one of a number of excitation signals, and when excited emit one of a number of detectable emission signals. For example, there may be L=16 markers resulting from $L_C=2$ emission signal excitable by $L_R=8$ distinct excitation signals, so that $L=L_C \times L_R$. The number of emission signals may be referred to as "colors" because they may have distinct wavelengths or spectra, and the number of excitation signals may be referred to as the number of "rounds" because the biological sample is exposed to one excitation signal per round.

For each excitation signal, the biological sample is imaged yielding an intensity at each of the $L_C$ colors as a function of position. A set of N positions is identified as candidate locations of marked molecules, for example, by virtue of there being sufficient emission across the rounds and colors at that location. Therefore, the sensing of a particular sample can yield L intensity measurements $I=(I_1, \ldots, I_L)$ for each of the N positions, $r^{(1)}, \ldots, r^{(N)}$.

The particular selection of which markers to apply to each type of a molecule of T difference molecule types can be thought of as a codebook $C=(c_1, \ldots, c_T)$, where each member (codeword) $c_t$ of that codebook identifies the unique subset of the L markers, with a codeword $c_t$ being represented as a L long vector $(c_{t,1}, \ldots, c_{t,L})$ with values 0 or 1 (i.e., a "binary," or "2-ary" vector), with 1 indicating that the marker associated with that position in the vector belongs to the subset of markers identified by that codeword.

One way to estimate the molecular type at a location in an image is to measure the intensities $I=(I_1, \ldots, I_L)$ at the emission colors, and determine a binary vector $(\hat{c}_1, \ldots, \hat{c}_L)$ where $\hat{c}_l=1$ if $I_l > \theta_l$ for thresholds $(\theta_1, \ldots, v_L)$. An estimate of the type of a molecule, $\hat{t}$, can then be chosen according to the closest codeword such that $\hat{t}=\arg\min_t d(\hat{c}, c_t)$ for some distance function d( ). A particular distance function is the number of positions in which the vectors differ, which is referred to as a "Hamming" distance. Recognizing that the estimation of the type is essentially a communication decoding procedure, the choice of codewords (i.e., codebook design) can similarly make use of communication techniques. For example, codebook design procedures can be used to choose the codebook. One characterization of a codebook is the "rate" of the codebook, which is the ratio of the number of types that are encoded (here T) and the logarithm of the number of distinct codewords. For example, if $T=2^K$, then the rate of the code is K/L. For example, for $T=256=2^8$ and L=16, the rate of the code is ½.

Under certain assumptions, such as the "bit error" probability of a code element $\hat{c}_l \neq c_{t,l}$ for the true type t being the same for all positions (i.e., for all the markers) and the same if the marker is present or not (i.e., the errors are "symmetric"), and all T types being equally likely a priori, conventional code design procedures can be used to minimize an average error. Code with L=16 and each codeword representing a subset of 4 markers (i.e., 4 1's in each $c_t$) design to provide a minimum Hamming distance of 4 (i.e., distance between codewords of at least 4, called "Minimum Hamming Distance 4 (MHD4)" codes), assigning codewords to types arbitrarily, and decoding by thresholding is known. The codebook had 140 members so T≤140 can be supported with the L=16 markers.

SUMMARY

Generally, the innovation includes a way to design a codebook for estimating the type of a molecule at a particular location in an image. In particular, the approach makes use of one or both of (1) knowledge of the non-uniform prior distribution of molecule types (i.e., some types are known a priori to occur more frequently than others) and/or knowledge of co-occurrence of molecule types at close locations (e.g., in a same cell); and (2) knowledge of a model of the (e.g., random) process that yields the intensities that are expected at a location when a molecule with a particular subset of markers (i.e., a molecule of a type that has been assigned a codeword that defines that subset) is present at that location.

A number of ways of designing a codebook with this knowledge can be used. The innovation includes at least one new way of designing the codebook that improves the accuracy (i.e., reduces the error rate) of identification. Conversely, for a particular level of accuracy, the approach can make use of fewer markers (e.g., fewer excitation rounds and/or fewer emission signals to be sensed) to be able to distinguish a greater number of types of molecules (i.e., generating larger codebooks).

One approach uses this knowledge to associate a subset of available codewords designed by a conventional approach (e.g., MHD4) leaving other codewords unused, to increase the accuracy of the system.

Another way of designing the codebook makes use of an optimization approach, in particular using a reinforcement learning approach.

In one aspect, in general, a method for identifying molecule types includes determining a marking of a set of molecule types. The marking of the set of molecule types includes a marking of each molecule type in the set of molecule types, and each marking of a molecule type includes an assignment of a distinct subset of markers from a plurality of markers. Sensor data representing emissions from sample molecules in a biological sample is received. The sample molecules are a subset of a set of marked molecules, with the marked molecules being marked according to the determined marking of the set of molecule types. Respective molecule types of the sample molecules are identified based on the received sensor data and marking of the set of molecule types. Determining the marking of the set of molecule types includes the following steps. A parameterized model of possible markings of the set of molecule types is formed (e.g., a generative probabilistic model), and values of parameters of the parameterized model are initialized. An iteration is repeated, with each iteration including (i) generating a random set of possible marking of the set of molecule types using the parameterized model, (ii) evaluating a utility of each possible marking of the set of possible markings, and (iii) updating the values of the parameters of the parameterized model. The marking of the set of molecule types is finally determined from values of the parameters of the model after the repeating of the iteration.

Aspects may have one of more of the following features.

The marking of the set of molecule types is represented as (and may be referred herein as) a codebook, and each marking of a molecule type is represented as (and may be referred hereinto as) a codeword. The codewords for all the molecule types together form the codebook. Each marker of the plurality of markers is associated with a distinct position (e.g., bit position in a codeword) in the codewords of the codebook. Generating the set of possible markings comprises generating an ensemble of codebooks.

Determining the marking of the set of molecule types uses a Reinforcement Learning (RL) procedure.

Generating the random set of possible marking uses a Gibbs Sampling procedure or an autoregressive procedure.

Evaluating the utility of each possible marking comprises performing a simulation of generation of sensor data from a plurality of molecule types according to the possible marking.

Identifying respective molecule types of the sample molecules uses a Bayesian decision procedure, for example, using a prior distribution of molecule types to yield a minimum average error rate procedure.

The markers comprise fluorescent markers, and each marker is responsive to at least one of a plurality of excitations, and has one of a plurality of emission signal characteristics.

The set of molecule types has a distribution characterizing a relative frequency of their presence in a sample, and determining a marking of a set of molecule types includes determining that marking according to the distribution.

Determining the marking of the set of molecule types according to the distribution includes evaluating the utility of each possible marking using the distribution. In some instances, evaluating the utility of a possible marking using said distribution includes computing a classification accuracy using the possible marking.

The set of molecule types has a distribution characterizing co-located occurrence of groups of two or more molecule types in a sample. Determining a marking of a set of molecule types includes determining said marking according to said characterization of co-located occurrence. The utility of each possible marking is then evaluated using said characterization of co-located occurrence.

In another aspect, a non-transitory machine-readable medium has instructions stored thereon. These instructions, when executed by a computer processor, cause the computer processor to perform all the steps of any one of methods set forth above.

DETAILED DESCRIPTION

Figure 1:
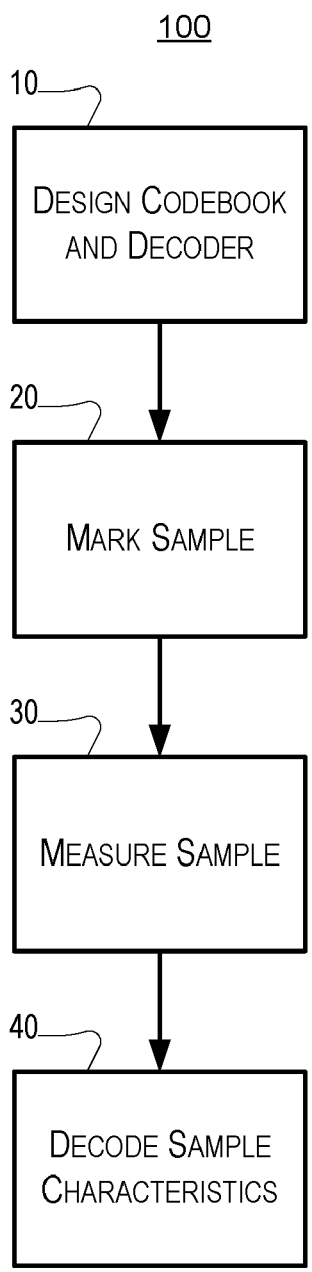
FIG. 1 is a flowchart of a marking and decoding process.

A number of embodiments described herein address the problems of experimentally efficient and accurate identification, counting, or otherwise processing a population of molecules in a biological sample using Multiplexed Fluorescence Microscopy. A general approach to these problems involves marking different types of molecules with markers that have been attached to the different types of molecules in a biological sample. Generally, each marker is characterized by a combination of an excitation characteristic and an emission characteristic. For fluorescence microscopy, the excitation is characterized by a frequency (or equivalently wavelength, spectrum, or "color") of an optical or other electromagnetic excitation signal, and the emission is characterized by a frequency (or equivalently wavelength, spectrum, or "color") of an optical emission signal. Each marker has a unique combination of an excitation characteristic and an emission characteristic, while in general multiple markers share each of the excitation characteristics and each of the emission characteristics.

There are a number of factors that affect the design of a system for processing the populations of molecules in a biological sample.

A first factor is that a set of possible molecule types can be large, for example, 140 types, 1000 types, etc. It is desirable to be able to have differently marked molecule types of a large number of molecule types whose presence can be processed in a biological sample. Also, the processing time to detect emissions from the markers in a sample can be substantial, for example, because of the time needed to collect a reliable measurement of weak emissions, and because of the sharing of emission characteristics among different markers. In general, only one excitation characteristic is generally used at a time. Therefore, it can be beneficial to be able to reduce the number of different excitations that may be needed to distinguish different molecule types in a sample. When only few sufficiently different emission characteristics are present for a particular excitation characteristic, distinguishing the emissions may be straightforward. However, more generally, and particularly when more emission characteristics are present, the detectors for emissions may be configurable. For example, a set of optical detectors may be primarily responsive to one emission characteristic, more generally, each detector has at least some potential response to multiple markers excited by a same excitation. Therefore it is desirable to be able to take advantage of as much of the marker-distinguishing information from the output of a detector.

Another factor is that the number of molecules of each type in a sample may span a range of several orders of magnitude (i.e., the relative population sizes, and therefore the relative probabilities of occurrence may span several orders of magnitude). Therefore, without accounting for such a range, the processing of the populations of molecules may essentially ignore or conversely lead to outsized false discovery of the more rare molecule types. One way of characterizing this factor is by using a distribution representing the probability or fraction of each molecule type that is expected before the sample is measured. Such a distribution may be referred to as the prior probability distribution of the molecule types.

Another factor is that various characterizations of "accuracy" may be adopted when designing the system. Such characterizations can be referred to as "performance measures". For example, in a task of identifying each molecule that is detected in a biological sample, one measure of accuracy is the fraction of correct classifications according to molecule type (or equivalently one minus the fraction of misclassification or non-classification of the molecule type). Another characterization of accuracy may involve detection characteristics for different molecule types, for example, expressed using Receiver Operating Characteristics (ROC) perhaps as an average or worst case Area Under the Curve (AUC) for the detection characteristics for the set of molecule types. Another factor is that the true mechanism that captures the entire process of causing molecules in a population to be marked, then excited, and then having the emissions detected can be somewhat complex. For example, a complete model of such a mechanism may have to address factors such as: failure of marking some fraction of molecules; self- or cross-excitation of markers causing emissions even when excitation signals for those markers are not explicitly provided and other excitation signals cause them to emit, or emissions are autonomous; a range of emission strength or other factors that affect detected emission measurements; and "cross-talk" between detectors for different emission characteristics, which cause a detector that is meant to be responsive to one emission characteristic to also respond to other emission characteristics.

These factors together can make it challenging to assign distinct subsets of markers to each of the types of molecules. As introduced above, each subset can be represented as a binary "codeword," where each bit position in the codeword represents the marker associated with that position being present with a value 1 and absent with a value 0. The set of codewords and their associations with the molecule types can be referred to as the "codebook."

Referring to FIG. 1 an overall process involves first designing a codebook of combinations of markers (i.e., codewords), as well as a corresponding "decoder" (e.g., a Bayesian classifier), which processes measurements of the markers (step 10). The molecule types are then marked by introducing the markers into the molecules according to the codebook (step 20). Samples of these marked molecules can then be measured, for example, with one sample being measured (step 30) and the measurement decoded to determine the characteristics (e.g., counts or concentrations of molecule types) of the sample (step 40).

One general class of approaches is based on selecting the set of codewords and their association with molecule types in a way that makes use of a model of the process from marking to detection, which may be referred to as the "channel." As introduced above, a simplified approach essentially assumes that each marker has an equal probability of being detected when not present and missed when present, and essentially ignores the prior probability distribution. Such a channel can be referred to as a "binary symmetric channel," where binary refers to the input (whether a particular marker is assigned to the molecule type) as well as the output (whether the marker is detected or not) being binary, and symmetric refers to the probability for false detection of the marker being the same as the probability of missed detection. This model leads to the codebook that can be formed as a "Minimum Hamming Distance" (MHD) code, which guarantees correct classification when the number of marker errors (false detection or missed detection) is limited, to say two errors over all the markers. However, this design approach may not be adequate to design a codebook that requires a relatively small number of measurements and/or can distinguish a large number of molecule types.

An alternative approach uses a distribution of measured intensity (e.g., at the output of a detector of a emission spectrum) of each marker under the two conditions of the marker having been associated with a molecule type being sensed, versus the condition that the marker is not associated with that type. In particular, the distribution of measured intensity of a marker, $I_l$ is assumed to be conditionally log-normal (or alternatively normal), conditioned on whether the $l^{th}$ marker is present in the $t^{th}$ molecule type, indicated with the codeword value $c_{t,l}$, with value of 1 indicating that the marker is present. That is, the probability density $p(\log I_l | c_{t,l}) = N(\mu_l[c_{t,l}], \sigma_l^2[c_{t,l}])$ for the true class t. There are various ways of determining the parameters $\mu_l$ and $\sigma_l$. For example, pure samples can be used in turn to estimate the parameters present in those known samples. Another way of estimating the values of $\mu_l[0], \sigma_l[0], \mu_l[1], \sigma_l[1]$, is to use an assumed prior distribution $\pi(t) = \text{prob}$(molecule type is t) of the populations in a mixed sample, and the known codebook C, which together provides the expected fraction of molecules that have a code value of 0 for the $l^{th}$ marker, and the fraction that have a value of 1, even if the specific assignment of the molecule types to the N locations of imaged molecules is not known. For example, each marker may have a prior probability of occurring in each molecule of the measured population. Within this way of estimating the values of the parameter of the model, one approach makes a classification of each detected molecule, while another approach can make a "soft" decision, and use a parameter estimation procedure such as the Estimate-Maximize (EM) procedure to determine the values.

Another alternative model attempts to more closely correspond to the physical processes involved. Rather than modeling the measured intensity at a point as outlined above (e.g., as a conditionally normal or log normal distribution), point emission rates $y_1, \ldots, y_L$, are assumed to follow a conditional model based on the codeword of an instance of the true molecule type at point (i.e., a location $r^{(n)}$). The locations of the N molecules follow a spatial distribution, for example, being sampled from a spatially uniform distribution independent of the molecule type or may follow some non-uniform spatial distribution (e.g., molecules being clustered at cell locations). These emissions rather are then assumed to be "spread" around each point according to a color-dependent spread function, and combined with a spatially uniform background rate. This yields a spatial distribution of emission rate (i.e., a spatial density of the rate). The intensity measured at a region in an image (e.g., a small region around a point of a molecule) is then assumed to follow a Poisson-Gaussian measurement model. That is, the intensity (i.e., a spatial power density) is modeled as a time-accumulation of emissions at the rate at each point with an additional additive term following a Gaussian distribution (e.g., representing a measurement noise). The intensity $I_l^{(n)}$ for the $n^{th}$ point in the image is then a space-integration of the modeled intensity in a vicinity of the point. Overall, this model of emission is intended to provide a better match to the true process by which the measurements for identified points are obtained. Note that this process also provides a way of quantifying the estimate and associated uncertainty in the underlying point emission rates $y_1, \ldots, y_L$, which may be used to quantify uncertainty in the classification of molecule types.

Ignoring the effect of neighboring points, the intensity measured for a marker l in the vicinity of a point in which that marker is present therefore has an expected intensity proportional to the point rate $y_l$ (drawn at random for each such marker) with a variance that is the sum of a first term that is proportional to that rate, and inversely proportional to the extent of the time and space integration of the image, and a second term that is fixed, with each term being dependent on the marker l. To the extent that the underlying rate $y_l$ is Gaussian with a certain mean ($\mu_l$) and variance ($\sigma_l^2$), the measured illumination has a greater variance accounting for the time- and space-integration and the observation noise.

Variants of this approach deal with measurement of multiple markers in each round. Recall that the L markers are grouped into $L_R$ excitation rounds, and $L_C$ "colors" per round. In one variant, the point emission rates at each round are independent conditioned on the codeword of the true molecule type, while in another variant a dependence of the emissions rate at different colors is assumed. A yet more complex variant of the model further assumes conditional dependence across all markers even if in different rounds.

Figure 2:
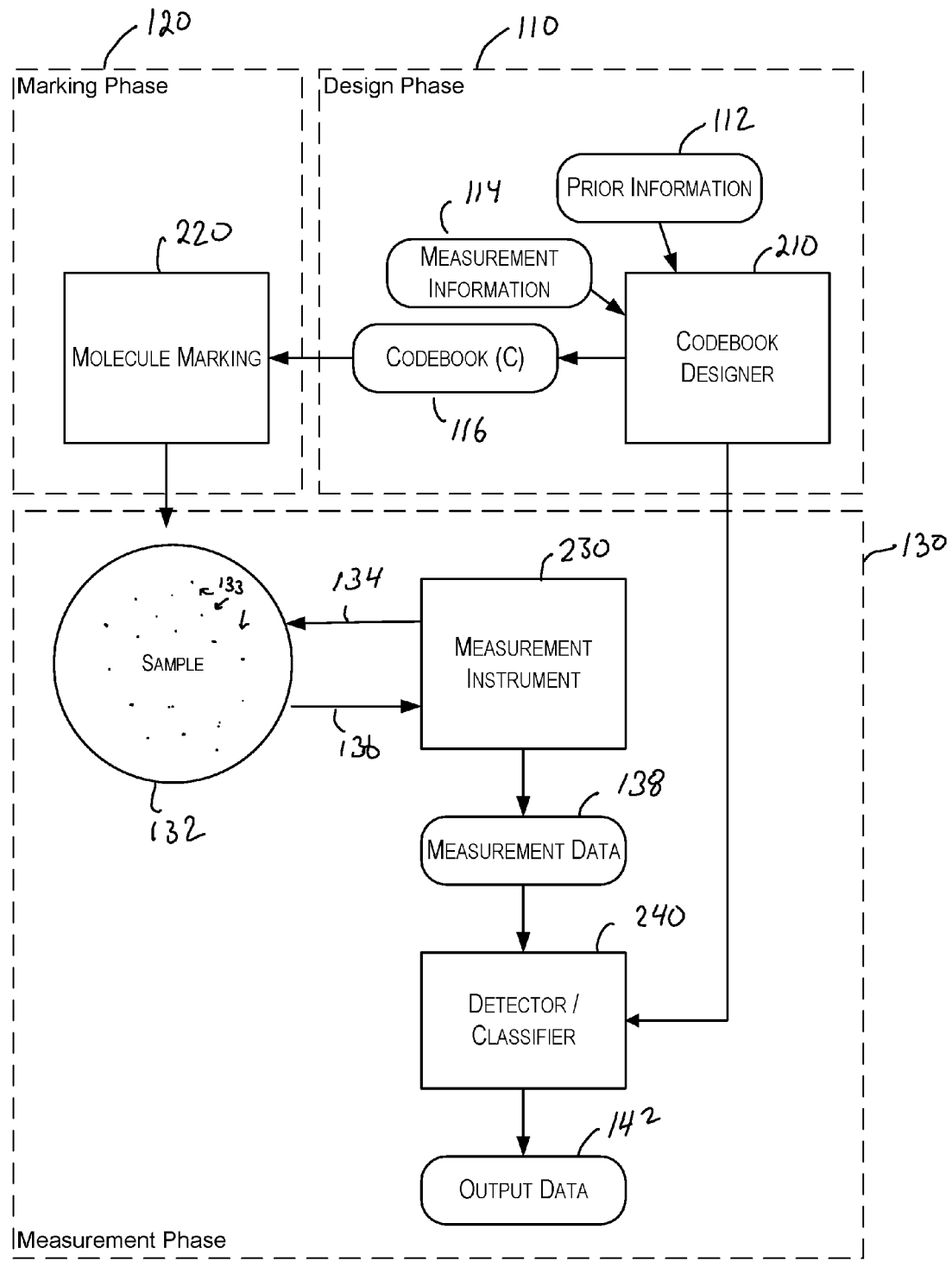
FIG. 2 is a schematic diagram of a marking and decoding process.

Referring to FIG. 2 the process outlined in FIG. 1 is shown with the three phases: a design phase 110, a marking phase 120, and a measurement phase 130. In the design phase 110, prior information 112, which may include the relative frequencies (e.g., prior probability distribution) of various molecule types and/or statistics of spatial cooccurence of molecule types, is combined with measurement information 114, which characterizes (e.g., models) the measurement process, in a codebook designer 210 to yield a codebook 116. In the marking phase 120, a molecule marking procedure 220 uses the designed codebook 116 to prepare material that ultimately yields a sample 132 to be measured. In the measurement phase 130, the sample 132 is measured to detect the emissions from molecules 133 in the sample. In particular, a measurement instrument 230 provides multiple rounds of excitation 134 to the sample 132, and receives emissions 136 in response to those excitations. The result of the measurement is measurement data 138, which may represent a spatial intensity map for each of the combinations of excitation and emission "colors," (e.g., L separate images/2D intensity maps). In the design phase 110, the design of the codebook 116 is coupled with design or configuration of a detector or classifier 240 that matches the codebook as well as the prior information 112 and measurement information 114. In the measurement phase 130, this detector/classifier 240 processes the measurement data 138 to yield output data 142, which may provide detection or classification information for molecule types at various positions in the sample, or may provide aggregate data for the sample as a whole, for example, as estimated counts or concentrations of various molecule types.

Given a model that maps from a codebook, C, to observations of molecule types that are marked according to that codebook, there is a performance measure $M(C)$ that is associated with that codebook. For a set of parameters $\phi$ that characterize the observation model, this performance can be expressed as $M(C|\phi)$ for the predicted (e.g., probabilistically expected) performance. However, it may be difficult to express that expected performance in a closed form, and an alternative is to form an estimate of that performance, $\hat{M}(C|\phi)$, based on a sample.

Such a sample may be obtained experimentally, in which case the "model" is a physical system and the corresponding decoding rule that maps measurements to decisions (e.g., classification, detection). Alternatively, the sample may be formed with a random simulation, for example, using Monte Carlo techniques. For example, a simulation drawing random molecule types can be used to estimate the performance measure $M(C)$. In the discussion below $M(C)$ is used interchangeably with the estimate $\hat{M}(C|\phi)$ to simplify the notation.

As the models get more complex, it is increasingly difficult to accurately determine the values of the parameters ($\phi$) of the model. Furthermore, as the models get more complex, it is also increasingly difficult to design a codebook that provides an optimal or close to optimal set of codewords and their associations to optimize a performance measure, such as expected misclassification rate.

Various forms of models may be used to generate the simulated observed data. For example, the model may generate observation values in the vicinity of a point of a randomly selected marked molecule. In some such examples, the randomly selected molecule is selected according to the prior probability of the different molecule types, while in other examples, the effect of the prior probabilities are incorporated into a class-weighted estimation of the overall performance measure.

In some examples, the model admits possible concurrence of two of more molecule types at a single point or in close proximity. Generally, the observation is approximately the union or sum of the observations that would be generated by each of the molecule types at the point. Depending on the assignment of the markers to those molecule types, the decoding procedure is able detect the presence of the multiple molecule types and further identify the separate molecule types. The generation of multiple molecule types may account for the prior probability of the group of molecule types at a point, for example, based on random sampling from the prior distribution of single molecule types, or by using a model that specifically predicts prior probabilities of particular sets of multiple molecule types. For example, certain mRNA are expected or known to co-occur with greater probabilities than might be expected from the prior probabilities of the individual types. For example, groups of multiple mRNA may be known to co-occur in certain cell types, and therefore may be expected to occur at a same location (i.e., the location of such a cell type) in an experimental sample.

Another form of model generates two-dimensional simulated images, and the performance is evaluated taking into account the steps that would be performed on an experimental image, including localization of the points that are decoded. As in the point model approach described above, such an image simulation may result in multiple marked molecules at the same or nearby points, and the performance measure is affected by the ability of the decoding procedure (which depends on the marking assignments) to detect such multiplicities and identify the separate molecule types.

Figure 3:
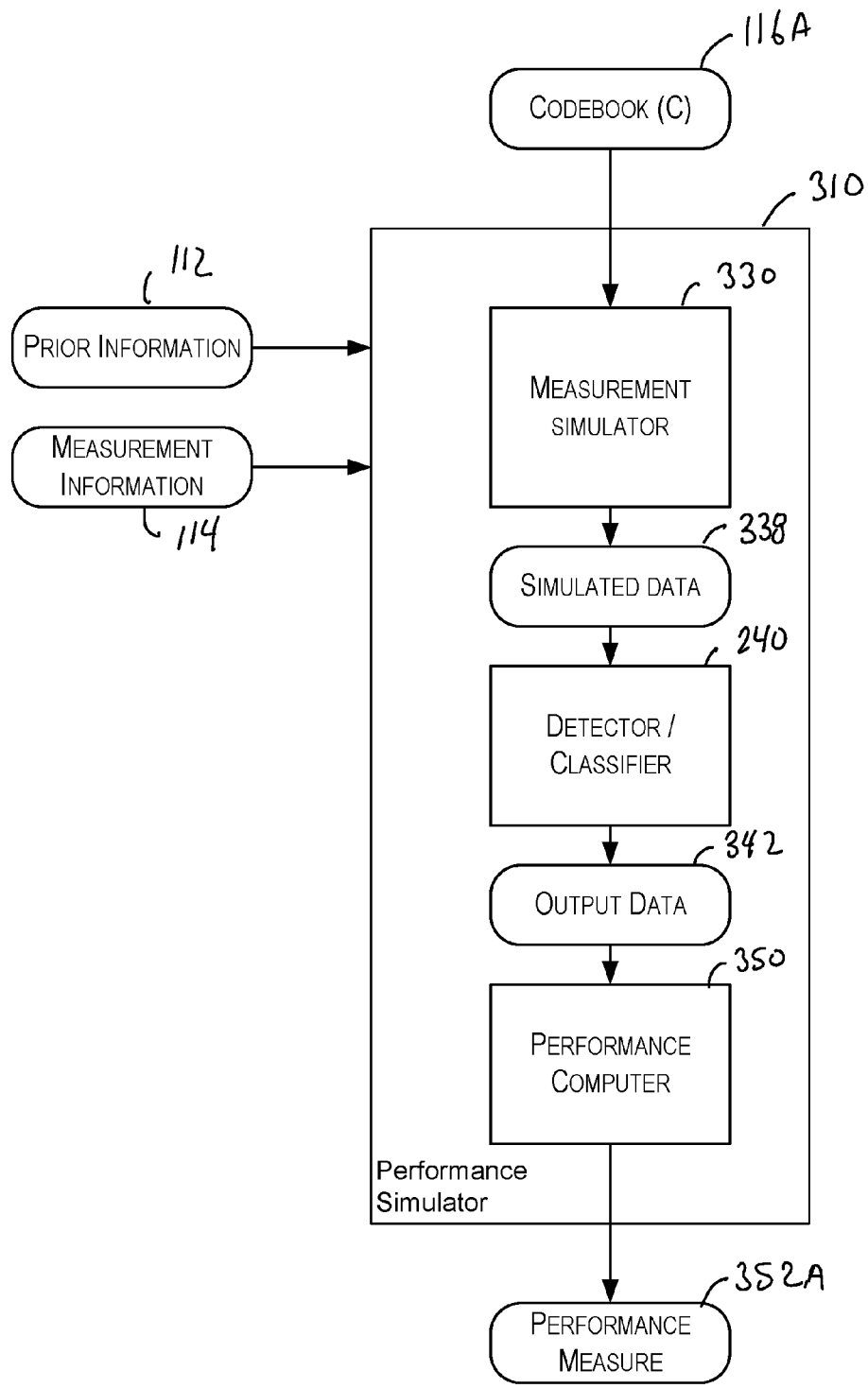
FIG. 3 is a schematic diagram of performance measurement procedure.

Referring to FIG. 3 given a particular codebook (C) 116A, a corresponding performance measure 352A for that codebook is based on the prior information 112 and the measurement information 114 (e.g., the parameters $\phi$ that characterize the observation model). A measurement simulator 330 uses the prior information and the measurement information to generate simulated data 338 for one or more simulated samples. This simulated data 338 is then processed in the same manner as true samples by the detector/classifier to yield output data 343. A performance computer 350 then determines the performance measure ($M(C)$) from the output data 342.

Given any of the models above, one approach to codebook design is by method of combinatorial optimization, for example, making incremental changes to codewords to improve the desired performance measure, or using search techniques such as Simulated Annealing or Genetic Algorithms. However, such techniques may require too much computation and/or may not yield a codebook with a high enough performance measure.

Another general class of approaches to optimize the codebook does not directly attempt to optimize a particular codebook, but optimizes a parameterized distribution of codebooks, for example to optimize a performance measure of selection of a codebook from that distribution.

One way of parameterizing a distribution of codebooks is to define a parameterized potential function for the codebook C, represented as $\Phi(C|\theta)$, where $\theta$ represents the set of parameters that determine the distribution over codebooks. To simplify the notation, the dependence on $\theta$ is often omitted from the notation below, but should be recognized by the context. The distribution is assumed to follow a Gibbs distribution, such that the probability of a particular codebook is assumed to be proportional to the exponential of the negative of the potential, $P(C|\theta) \propto \exp(-\Phi(C|\theta))$. Given a fixed set of parameter values, codebooks can be sampled from the probability distribution using a Markov Chain Monte Carlo (MCMC) procedure. Depending on the structure of $\Phi$, in particular if it admits an autoregressive form, one may also be able to draw samples from $P(C)$ directly via ancestral sampling. Concretely, assuming that:

$$\Phi(C|\theta) = \Phi(c_1|\theta) + \Phi(c_1|c_2, \theta) + \Phi(c_3|c_1, c_2, \theta) + \ldots$$

where $c_t$ is the codeword for molecule type t, sorted in descending order with respect to the prior distribution, then a codebook can be sampled exactly through a simple sequential (ancestral) sampling procedure.

For a current set of parameter values, the MCMC approach is used to generate a set of N (e.g., N=1000) codebooks, $C_1, \ldots, C_N$. For each of these codebooks, $C_n$, the performance measure $M_n = M(C_n)$ is determined, for example, based on a parameterized measurement model of one of the types described above. Averaging these performance measures (i.e., $\overline{M}$=average($M_n$, n=1, ..., N) provides an expected performance measure of codebooks generated using this measure. It is this expected performance measure that is optimized. In some techniques discussed below, rather than considering all N codebook samples, only a subset of the highest performing codebooks are used (e.g., a fixed number, say 256, or a fixed fraction 20% of codebooks with performance within a range of performance of the highest performing codebook, etc.).

The parameters of the potential function are updated from iteration to iteration to increase the expected performance of the randomly sampled codebooks. That is, given the sample of codebooks, $C_1, \ldots, C_N$, the parameters $\theta$ of the potential function are adjusted so that the higher performing codebooks have incrementally higher probability of being generated, while lower performing codebooks have incrementally lower probability of being generated. This can be achieved directly by updating the parameters of the potential function $\Phi(C|\theta)$. At a final iteration, samples from a final codebook distribution are evaluated and the highest performance codebook is retained.

The optimization of the parameters $\theta$ can also be considered a special/degenerate case of the REINFORCE Reinforcement Learning (RL) procedure in the case that a selection of a next codebook $C_t$ is viewed as a stochastic action selected from the current distribution $P(C|\theta)$ without depending on any state (e.g., a state-independent stochastic policy). With this point of view, the updating of the parameters can make use of a utility defined as:

$$J(\theta) = \mathbb{E}_{C \sim P(C|\theta)}[M(C)]$$

which leads to $$\nabla J(\theta) = \mathbb{E}_{C \sim P(C|\theta)}[M(C) \nabla \log P(C|\theta)].$$

Optionally, an (arbitrary) baseline term is added, so that $M(C)$ above is replaced with $M(C)-B$, where B is an arbitrary constant. Note that B is arbitrary in the sense that $\nabla J(\theta)$ is indifferent to its value (i.e., because $\mathbb{E}_\theta[B \nabla_\theta P(C|\theta)] = 0$). However, if $\mathbb{E}_{C \sim P(C|\theta)}$ is approximated with a finite number of Monte Carlo samples, then with judiciously chosen B, once can reduce the variance of the gradient estimate. For example, with a draw of N samples from $P(C|\theta)$, and the average $M(C)$ over those samples as baseline, $B = (1/N) \Sigma_{i=1}^N M(C_i)$, is used.

Using such an "empirical baseline" the gradient update rule becomes:

$$\theta_{n+1} = \theta_n + \gamma \nabla J(\theta),$$

where:

$$\nabla J(\theta) \approx (1/N) \sum_{i=1}^{N} [(M(C_i) - B) \nabla \log P(C_i | \theta)].$$

Intuitively, we move along a direction that increases the probability of codebooks in which their performance is above the empirical baseline (i.e. the average performance), and decreases the probability of underperforming codebooks (again, with respect to the average performance).

Figure 4:
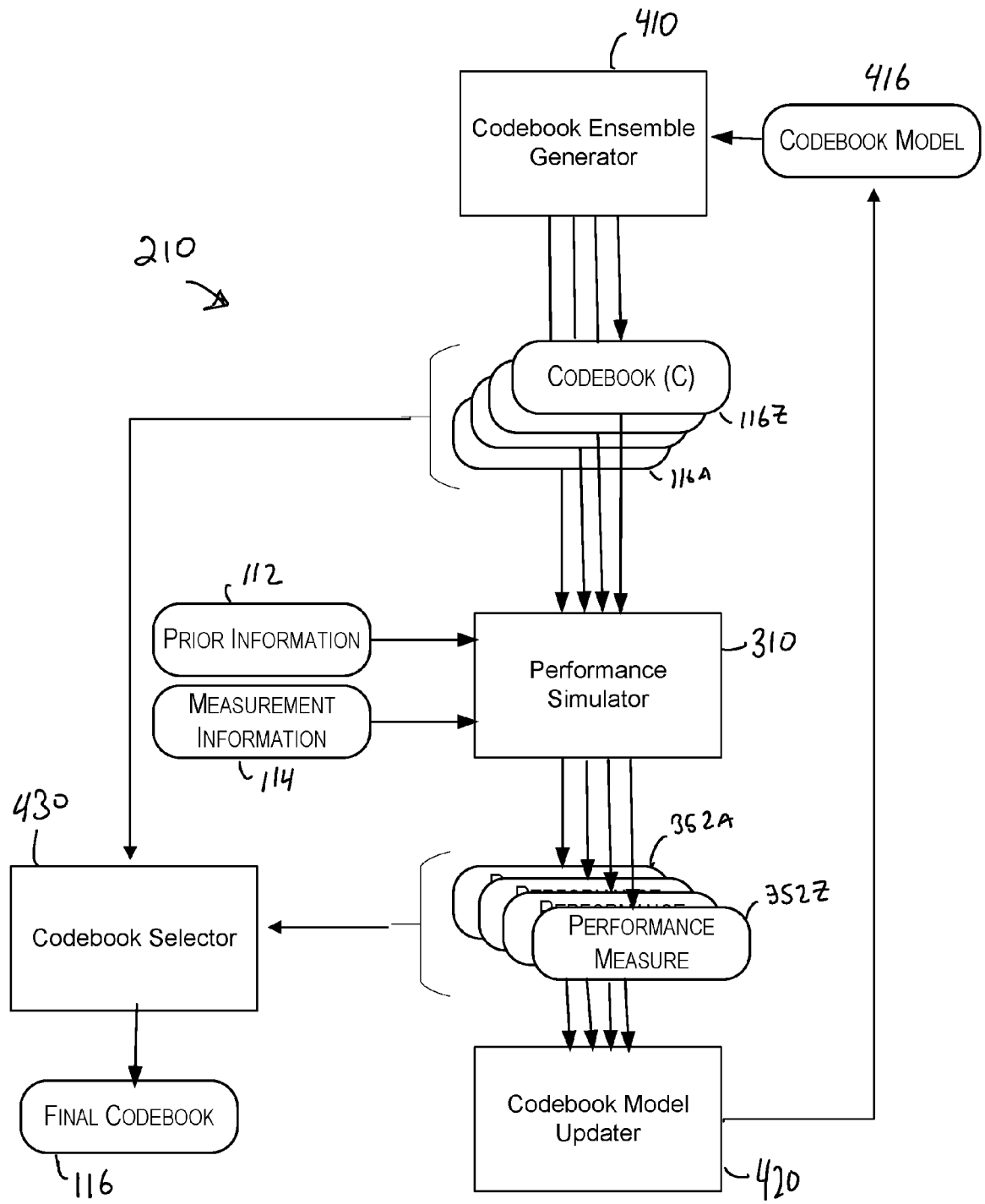
FIG. 4 is a schematic illustration of a codebook design process.

Referring to FIG. 4, the process described above iteratively updates a codebook model 416 (e.g., the parameter values $\theta$). Given a current codebook model, a codebook ensemble generator 410 generates the set of N codebooks, illustrated in the figures as codebooks 116A-Z. For each of these codebooks, the performance simulator illustrated in FIG. 3 is used to determine corresponding performance measures 352A-Z. Given these performance measure, a codebook model updater determines an incremental update to the codebook model 416 (e.g., the increment $\gamma \nabla J(\theta)$ discussed above). After a final iteration in which an ensemble of codebooks and their corresponding performance measures are computed, a codebook selector 430 selects a final codebook 116, for example, being a selection of one of the codebooks 116A-Z that has the best performance measure. This final codebook 116 is used in the process illustrated in FIG. 2.

A variety of forms of potential functions may be used. A preferred form is motivated by the physical processes such that codebooks that have higher performance measures have higher potential. In particular, the potential is based on a number of constituent terms.

A first constituent term depends on a pair of input types, t and t', and the corresponding codewords for those types, c and c', respectively. This term has the form $$S_{t,t'}(c,c') = \gamma_{t,t'} S(c,c')$$

where the S term on the right hand side of the equation is independent of the input types, and the $\gamma$ term is independent of the codewords assigned to the types. The $\gamma$ terms are part of the parameter set $\theta$, and the S term is also parameterized by $\theta$. One form of parameterization of S(c, c') is as a multilayer artificial neural network, parameterized by weights between units of different layers of the neural network.

A second constituent term depends on individual codewords, and has the form $$\varphi_t(c) = \beta_\varphi \varphi(n[c]; \alpha_t)$$

where $\beta_\varphi$ is a scaling constant, and $\varphi(n[c]; \alpha)$ is a fixed function of the number of ones in the codeword c, denoted n[c], and $\alpha_t$ is a parameterized function of the prior probability of the molecule type t that maps $\pi(t)$ to $\alpha_t[0]$ and $\alpha_t[1]$. One choice of the fixed function $\varphi$ is:

$$\varphi(n;\alpha) = -\log\left[\frac{L!\,\Gamma\left(\sum_{s=0}^{1}\alpha[s]\right)}{\Gamma\left(L+\sum_{s=0}^{1}\alpha[s]\right)}\prod_{s=0}^{1}\frac{(n[s]+\alpha[s])}{(n[s]!\,\Gamma[\alpha[s]])}\right]$$

Finally, the overall parameterized potential function is formed as $$\Phi(C) = \sum_{t,t'} S_{t,t'}(c_t, c_{t'}) + \sum_t \varphi_t(c_t)$$

A summary of an approach as outlined above includes the following steps:
1. Determine a model that provides a mapping from a codebook C to a performance measure for the codebook M(C). For example, this may include parameters $\phi$ of a measurement model, the decoding rule, and a choice of performance measure.
2. Initialize parameters $\theta$ of a potential function for the codebook.
3. Repeat:
    (a) generate a random sample of codebooks based on the potential function, for example, using a MCMC method.
    (b) determine the performance of each of these codebooks using the model of step 1.
    (c) if this is the last iteration, choose the highest performance codebook otherwise, incrementally adjust the parameters $\theta$ of the potential function to increase the probabilities of the high performance codebooks relative to the relatively lower performance codebooks.

Implementations of the procedures described above may be implemented in software, for example, with instructions stored on a machine-readable medium that when executed by a processor (e.g., of a general purpose or special purpose computer) cause the processor to perform the steps of the procedures.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for identifying molecule types comprising:
   determining a marking of a set of molecule types, the marking of the set of molecule types comprising a marking of each molecule type in the set of molecule types, each marking of a molecule type comprising an assignment of a distinct set of markers from a plurality of markers;
   receiving sensor data representing emissions from sample molecules in a biological sample, the sample molecules being a subset of a plurality of marked molecules, the marked molecules being marked according to the determined marking of the set of molecule types; and
   identify respective molecule types of the sample molecules based on the received sensor data and marking of the set of molecule types;
   wherein determining the marking of the set of molecule types comprises optimizing the markings of the set based on at least one of a prior distribution of the molecule types and co-occurrence information for the molecule types.

2. The method of claim 1, wherein identifying respective molecule types of the sample molecules comprises applying a Bayesian decision procedure.

3. The method of claim 1, wherein determining the marking of the set of molecule types comprises using a Reinforcement Learning (RL) procedure.

4. The method of claim 1, wherein determining the marking of the set of molecule types comprises
   forming a parameterized model of possible markings of the set of molecule types;
   initializing values of parameters of the parameterized model;
   repeating an iteration including (i) generating a random set of possible marking of the set of molecule types using the parameterized model, (ii) evaluating a utility of each possible marking of the set of possible markings, and (iii) updating the values of the parameters of the parameterized model; and
   determining the marking of the set of molecule types from values of the parameters of the model after the repeating of the iteration.

5. The method of claim 4, wherein generating the random set of possible marking comprises applying a Gibbs Sampling procedure or a autoregressive procedure.

6. The method of claim 4, wherein evaluating the utility of each possible marking comprises performing a simulation of generation of sensor data from a plurality of molecule types according to the possible marking.

7. The method of claim 1, wherein the marking of the set of molecule types is represented as a codebook, and each marking of a molecule type is represented as a codeword, the codewords together forming the codebook, and each marker of the plurality of markers is associated with a distinct position in the codewords of the codebook.

8. The method of claim 1, wherein the markers comprise fluorescent markers, wherein each marker is responsive to at least one of a plurality of excitations, and has one of a plurality of emission characteristics.

9. The method of claim 1, wherein the set of molecule types has a distribution characterizing a relative frequency of their presence in a sample, and wherein determining a marking of a set of molecule types includes determining said marking according to said distribution.

10. The method of claim 9, wherein determining the marking of the set of molecule types according to the distribution comprises evaluating the utility of each possible marking using said distribution.

11. The method of claim 10, wherein evaluating the utility of a possible marking using said distribution comprises computing a classification accuracy using the possible marking.

12. The method of claim 1, wherein the set of molecule types has a distribution characterizing co-located occurrence of groups of two or more molecule types in a sample, and wherein determining a marking of a set of molecule types includes determining said marking according to said characterization of co-located occurrence.

13. The method of claim 12, wherein determining the marking of the set of molecule types according to the distribution comprises evaluating the utility of each possible marking using said characterization of co-located occurrence.

14. The method of claim 13, wherein evaluating the utility of a possible marking using said characterization of co-located occurrence comprises computing an accuracy of detection of co-location of molecule types using the possible marking.

15. The method of claim 1, wherein:
determining the marking of the set of molecule types comprises
forming a parameterized model of possible markings of the set of molecule types;
initializing values of parameters of the parameterized model;
repeating an iteration including (i) generating a random set of possible marking of the set of molecule types using the parameterized model, (ii) evaluating a utility of each possible marking of the set of possible markings, and (iii) updating the values of the parameters of the parameterized model; and
determining the marking of the set of molecule types from values of the parameters of the model after the repeating of the iteration, including determining said marking according to a distribution characterizing co-located occurrence of groups of two or more molecule types in a sample; and
evaluating the utility of each possible marking comprises performing a simulation of generation of sensor data from a plurality of molecule types according to the possible marking; and
the marking of the set of molecule types is represented as a codebook, and each marking of a molecule type is represented as a codeword, the codewords together forming the codebook, and each marker of the plurality of markers is associated with a distinct position in the codewords of the codebook.

16. A method for determining a marking of a set of molecule types, the marking of the set of molecule types comprising a marking of each molecule type in the set of molecule types, each marking of a molecule type comprising an assignment of a distinct set of markers from a plurality of markers, the marking being determined for multiplexed fluorescence microscopy, the method comprising:

forming a parameterized model of possible markings of the set of molecule types;
initializing values of parameters of the parameterized model;
repeating an iteration including (i) generating a random set of possible marking of the set of molecule types using the parameterized model, (ii) evaluating a utility of each possible marking of the set of possible markings, and (iii) updating the values of the parameters of the parameterized model;
determining the marking of the set of molecule types from values of the parameters of the model after the repeating of the iteration; and
providing the determined marking for preparing a biological sample to be analyzed using multiplexed fluorescence microscopy.

17. A non-transitory machine-readable medium having instructions stored thereon, said instructions, when executed by a computer processor, cause the computer processor to perform steps including:
determining a marking of a set of molecule types, the marking of the set of molecule types comprising a marking of each molecule type in the set of molecule types, each marking of a molecule type comprising an assignment of a distinct set of markers from a plurality of markers;
receiving sensor data representing emissions from sample molecules in a biological sample, the sample molecules being a subset of a plurality of marked molecules, the marked molecules being marked according to the determined marking of the set of molecule types; and
identify respective molecule types of the sample molecules based on the received sensor data and marking of the set of molecule types;
wherein determining the marking of the set of molecule types comprises optimizing the markings of the set based on at least one of a prior distribution of the molecule types and co-occurrence information for the molecule types.

* * * * *